Patented Apr. 3, 1945

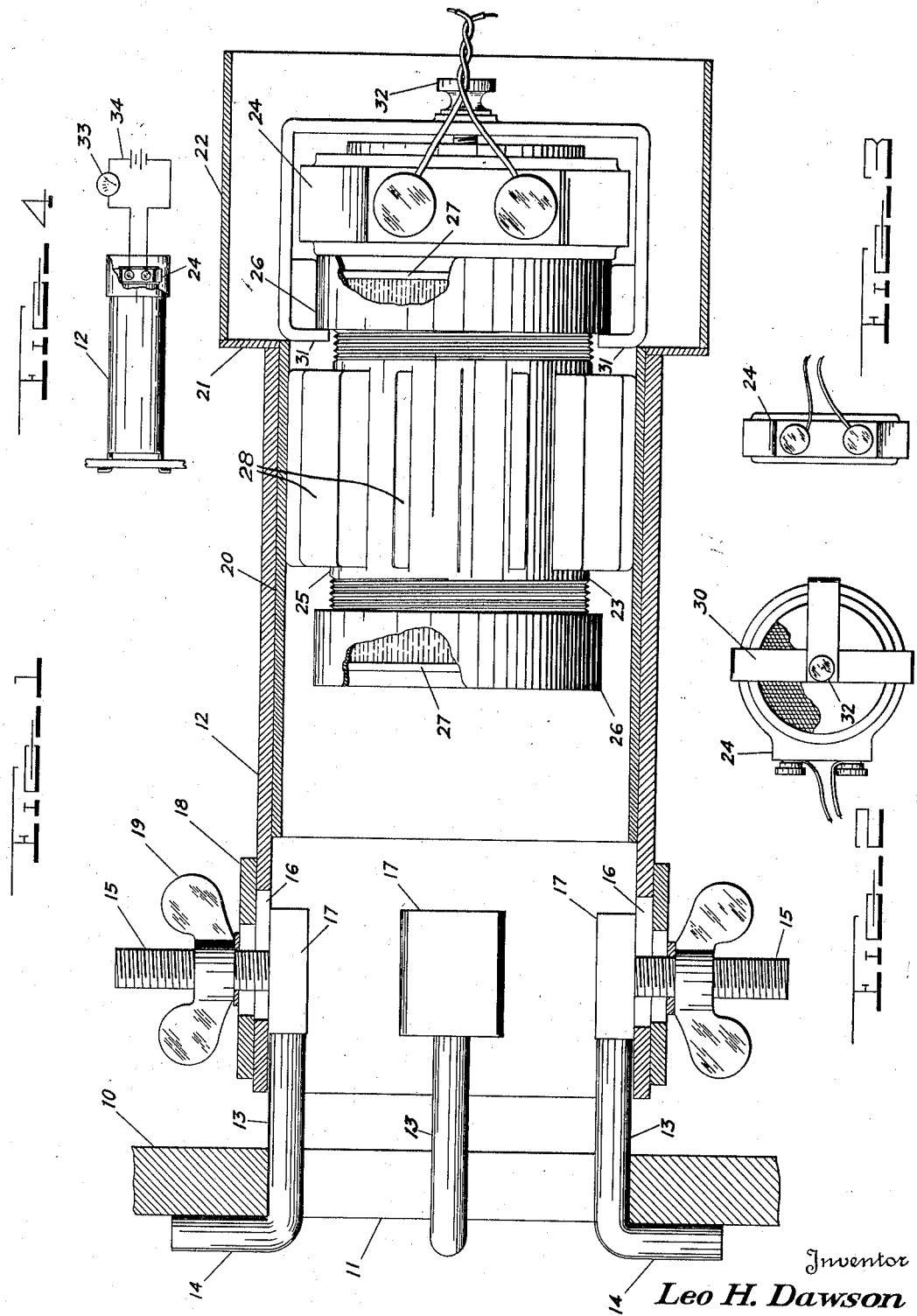

2,372,661

UNITED STATES PATENT OFFICE 2,372,661

MEANS FOR MEASURING SURFACE BRIGHTNESS

Leo H. Dawson, Washington, D. C.

Application April 7, 1942, Serial No. 437,973

3 Claims. (Cl. 88—22.5)

(Granted under the act of March 3, 1883, as amended April 30, 1928; 370 O. G. 757)

This invention relates to means for measuring the surface brightness of a flame, particularly that of a hot, closely confined flame such as the flame of a furnace.

While it is known that the brightness of a flame may be measured by the use of a light sensitive cell, yet in the case of an intense flame, of necessity closely confined by opaque heat resisting walls such as those of a furnace, the use of a light sensitive cell has in the past been rendered impractical by lack of means to properly protect the delicate cell from the destructive heat of the flame, and at the same time to preserve unobstructed the path of the light rays from the flame to the cell.

This difficulty applicant has overcome by providing a means for supporting a light sensitive cell in line with an opening in the furnace wall and the flame, which means interposes between the cell and the flame a body of transparent cooling fluid and provides for the utilization of the air supplied for combustion to maintain the temperature of the cooling fluid at a safe value.

It is an object of this invention to provide a means supporting and positioning a light sensitive cell for the measurement of the surface brightness of a flame, while protecting said cell from the destructive effect of said flame.

It is another object of this invention to provide a means for simultaneously supporting, positioning and shielding a light sensitive cell for the measurement of the surface brightness of a flame, said means comprising a body of transparent fluid interposed between said cell and said flame.

It is a further object of this invention to provide a means for simultaneously supporting, positioning and shielding a light sensitive cell for the measurement of the surface brightness of a flame, said means comprising a body of transparent fluid interposed between said cell and said flame and means utilizing the air provided for combustion to maintain the temperature of said fluid at a safe value.

Other objects of the invention will become apparent from a careful consideration of the following description when taken together with the accompanying drawing in which:

Fig. 1 is an elevational view in cross-section of a device embodying the invention, portions of the device being broken away;

Fig. 2 is an elevational view of a photoelectric cell and its holding means forming a part of the device shown in Fig. 1, a portion of the cell being broken away;

Fig. 3 is a plan view of the photoelectric cell of Figs. 1 and 2; and

Fig. 4 is a schematic showing of an indicating circuit embodying the device of Fig. 1.

As shown in Fig. 1 the device consists essentially of a tubular holding means for supporting a photoelectric cell in such manner that the light from the furnace flame may be directed upon it, together with a means for shielding the cell from the heat of the furnace flame without obstructing the path of the light rays from the flame to the cell. Fig. 1 shows a section of furnace wall 10 having a hole 11 formed therein. A tube 12 is provided with means for securing it in position against the rim of the hole with its axis normal to the furnace wall. Clamping means are shown consisting of a plurality of rods 13 having their extremities bent outwardly as at 14 to engage the inside of the furnace wall. The other ends of the rods 13 are flattened and enlarged as shown at 17 and provided with threaded bolt-like extensions 15 extending outwardly through slots 16 formed in the tube 12. A slotted plate 18 conforming in shape to the outside of the tube 12 fits over each of the threaded portions 15. Each of the threaded portions 15 is supplied with a wing nut 19 by which the whole clamping assembly may be locked in place. The surface of each of the enlarged portions 17 adjacent the inner surface of tube 12 conforms in shape thereto so that by proper manipulation, plate 18, together with the corresponding portion 17, may be positioned so as to substantially prevent the entry of light through the slots 16. Although the tube 12 is shown spaced from the boiler wall 10, in actual use it would be secured in contact with the boiler wall so as to exclude the entry of light at that point.

Fitting inside the outer ends of tube 12 is a second tube 20 which is shouldered at 21 to provide a flared outer end 22. Tube 20 is so dimensioned as to make a snug fit within the tube 12.

Carried within the tube 20 is an assembly comprising a shielding device 23 having a light sensitive cell 24 clamped to its outer end. The shielding device comprises the central tubular member 25 threaded at its ends and having a plurality of cooling fins 28 attached to its central portion. These fins 28 extend axially over the tubular member 25 are so dimensioned that the assembly fits with a snug sliding fit within the tube 20. A cap member 26 is screwed over each end of member 25 with a liquid-tight fit. Each cap member has a transparent end wall 27. The interior of the shielding means 23 is substantially completely filled with a cooling liquid such as water. The light sensitive cell 24 is held securely against the outer end of the shielding means 23 by clamping means 30 which is built up of flat strips as shown in Figs. 1 and 2. These strips have their free ends bent inwardly as at 31 to engage behind the inner edge of the outer cap 26. Thus engaged, the clamping means 30 forms with the cap 26 a pocket open at the top within which the cell 24 is contained. A set screw 32 is provided for securely clamping the cell against the cap 26.

In the operation of the device the tube 12 is secured against the outer surface of the boiler wall with its inner extremities surrounding the hole formed therein and with the other parts of the device assembled, as shown at Fig. 1. This form of the device is intended for use in a part of the boiler casing exposed to the air which is supplied to maintain combustion in the furnace. Under such circumstances air will be forced between the shielding means 23 and the tube 20, thus cooling the shielding means through the fins 28. The light-sensitive cell 24 may be selected from any of the conventional types, such as the selenium cell, the vacuum or gas-filled cell, or the blocking layer type. The cell may be connected in a conventional indicator circuit 34 so arranged that the current variations in the circuit are dependent upon variations in the intensity of the light falling upon the cell and such current variations are indicated upon a dial 33. The reading will serve as a means for accurately determining whether the boiler efficiency being obtained is the maximum attainable for the current steaming rate. If desired the dial may be calibrated to read directly in terms of boiler efficiency.

An operator may thus readily ascertain whether or not his boiler is operating at maximum efficiency by varying the fuel-air ratio. Any variation which lowers the reading of the indicator may be considered as lowering the boiler efficiency and any variation which increases the reading may be considered as increasing the boiler efficiency. If variations in both directions lower the reading, then the operator will know that his boiler is operating at its maximum efficiency for the operating conditions prevailing.

While the applicant has shown what is now the preferred embodiment of the invention, it is to be expressly understood that many variations and substitutions in the structure shown are possible within the scope of the invention as defined by the appended claims.

The invention described herein may be manufactured and used by or for the Government of the United States of America for governmental purposes without the payment of any royalties thereon or therefor.

I claim:

1. Means for measuring the surface brightness of the flame of a furnace, comprising a photoelectric cell, means supporting said cell in the path of light rays from the flame of said furnace, said supporting means comprising a tube open at both its ends, and light pervious shielding means carried within said tube between said cell and said flame, said shielding means comprising a hollow container having its outside diameter smaller than the internal diameter of said tube, a body of cooling fluid in said container and a plurality of fins extending outwardly from the surface of said container and longitudinally of said tube and acting to support and center said shielding means and said cell within and spaced from the walls of said tube to permit the passage of air around said container through passage ways bounded by said tube, said container, and said fins, for the purpose of cooling said cell and said container.

2. Means for measuring the surface brightness of the flame of a furnace, said furnace comprising a wall having a hole formed therein, said means comprising a tubular member open at both its ends, means supporting said tubular member against the outside of said furnace wall in such juxtaposition to said hole that light rays from the flame of said furnace may travel through said tubular member, a light pervious shielding means comprising a container having light pervious ends, a body of light pervious cooling fluid contained within said container, a plurality of cooling fins formed on and extending outwardly from said container and serving to support it within said tubular member, said fins being so disposed as to define open passageways extending longitudinally of said tubular member, a photoelectric cell having its external dimensions smaller than the internal diameter of said tubular member, and means securing said photoelectric cell in said tubular member outwardly of said cooling means and spaced from the walls of said tubular member so that a flow of air may take place between said cell and the walls of said tubular member and between said shielding means and the walls of said tubular member.

3. Means for measuring the surface brightness of a flame requiring air for its combustion, comprising a tubular means open at both its ends through which said air is supplied, shielding means substantially impervious to heat rays emanating from said flame but pervious to light rays emanating therefrom, cooling fins carried by and supporting said shielding means in said tubular means in a manner to define passages for the flow of air between said shielding means, said fins and said tubular means, a photoelectric cell, and means supporting said cell in such a manner that said shielding means lies between it and said flame.

LEO H. DAWSON.